(12) United States Patent
Igoe

(10) Patent No.: US 8,776,147 B2
(45) Date of Patent: Jul. 8, 2014

(54) SOURCE DEVICE CHANGE USING A WIRELESS HOME ENTERTAINMENT HUB

(75) Inventor: Patrick T Igoe, Philadelphia, PA (US)

(73) Assignee: Porto Vinci Ltd. Limited Liability Company, Wilmington, DE (US)

( * ) Notice: Subject to any disclaimer, the term of this patent is extended or adjusted under 35 U.S.C. 154(b) by 823 days.

(21) Appl. No.: 11/535,232

(22) Filed: Sep. 26, 2006

(65) Prior Publication Data

US 2008/0066122 A1    Mar. 13, 2008

Related U.S. Application Data

(63) Continuation of application No. 11/470,862, filed on Sep. 7, 2006.

(51) Int. Cl.
 H04N 7/18 (2006.01)
 H04N 7/173 (2011.01)
 H04N 7/16 (2011.01)

(52) U.S. Cl.
 USPC ................................. 725/80; 725/78; 725/81

(58) Field of Classification Search
 USPC ............... 725/80, 81, 82, 131, 133, 139, 141, 725/151, 153
 See application file for complete search history.

(56) References Cited

U.S. PATENT DOCUMENTS

| | | | |
|---|---|---|---|
| 4,613,848 A | 9/1986 | Watkins | |
| 4,796,019 A | 1/1989 | Auerbach | |
| 5,400,433 A | 3/1995 | Davis et al. | |
| 5,757,360 A | 5/1998 | Nitta et al. | |
| 5,793,409 A | 8/1998 | Tetsumura | |
| 5,973,683 A | 10/1999 | Cragun et al. | |
| 6,032,202 A | 2/2000 | Lea et al. | |
| 6,038,545 A | 3/2000 | Mandeberg et al. | |
| 6,122,386 A | 9/2000 | Wiley | |
| 6,131,130 A | 10/2000 | Van Ryzin | |
| 6,205,430 B1 | 3/2001 | Hui | |
| 6,219,839 B1 | 4/2001 | Sampsell | |
| 6,279,029 B1 * | 8/2001 | Sampat et al. | ................ 709/203 |

(Continued)

FOREIGN PATENT DOCUMENTS

| | | |
|---|---|---|
| EP | 893779 A1 | 1/1999 |
| EP | 1550968 | 7/2005 |
| WO | WO2008059325 | 5/2008 |

OTHER PUBLICATIONS

Web pages: Neosonik All-Digital Wireless Home Theater System Unveiled, http://news.com.com/home+audio+without+the+wires/ 2100-1041_3-6142125.html, Dec. 23, 2006, 3 pgs.

(Continued)

*Primary Examiner* — Benjamin R Bruckart
*Assistant Examiner* — Jason Thomas
(74) *Attorney, Agent, or Firm* — Volpe and Koenig, P.C.

(57) ABSTRACT

A method of registering a device with a wireless home entertainment hub in a home entertainment system includes broadcasting by a wireless home entertainment hub a request for a reply from at least one unregistered device. The reply is received from at least one of the unregistered devices and a list of the at least one unregistered device is presented to a user for the purpose of the user selecting a device to register. An indication of the registration of the device selected by the user for registration is stored, and the selected device is removed from the list of unregistered devices after the indication of the registration is stored.

45 Claims, 11 Drawing Sheets

(56) References Cited

U.S. PATENT DOCUMENTS

| | | |
|---|---|---|
| 6,430,605 B2 | 8/2002 | Hunter |
| 6,481,013 B1 | 11/2002 | Dinwiddie et al. |
| 6,665,020 B1 | 12/2003 | Stahl et al. |
| 6,747,632 B2 | 6/2004 | Howard |
| 6,845,097 B2 | 1/2005 | Haller et al. |
| 6,868,292 B2 | 3/2005 | Ficco et al. |
| 6,886,095 B1 | 4/2005 | Hind et al. |
| 6,904,451 B1 | 6/2005 | Orfitelli et al. |
| 6,907,301 B2 | 6/2005 | Kou et al. |
| 6,918,084 B1 | 7/2005 | Slaughter et al. |
| 6,967,588 B2 | 11/2005 | Zustak et al. |
| 7,038,581 B2 | 5/2006 | Kendall et al. |
| 7,098,869 B2 | 8/2006 | Vaitekunas et al. |
| 7,136,709 B2 | 11/2006 | Arling et al. |
| 7,139,981 B2 | 11/2006 | Mayer et al. |
| 7,146,567 B1 | 12/2006 | Duczmal et al. |
| 7,231,605 B1 | 6/2007 | Ramakesavan |
| 7,234,115 B1 | 6/2007 | Sprauve et al. |
| 7,310,808 B2 | 12/2007 | Kou |
| 7,336,801 B2 | 2/2008 | Mehrotra et al. |
| 7,436,300 B2 | 10/2008 | Glass et al. |
| 7,447,317 B2 | 11/2008 | Herre et al. |
| 7,460,827 B2 | 12/2008 | Schuster et al. |
| 7,493,645 B1 | 2/2009 | Tranchina |
| 7,721,313 B2* | 5/2010 | Barrett ............... 725/89 |
| 7,784,071 B2 | 8/2010 | Vince et al. |
| 2001/0009424 A1 | 7/2001 | Sekiguchi |
| 2001/0021655 A1 | 9/2001 | Maeshima |
| 2001/0028655 A1 | 10/2001 | Noda et al. |
| 2002/0039479 A1 | 4/2002 | Watanabe et al. |
| 2002/0062417 A1* | 5/2002 | Rudland et al. ............... 710/306 |
| 2002/0065564 A1 | 5/2002 | Sheriff et al. |
| 2002/0107737 A1 | 8/2002 | Kaneko et al. |
| 2002/0144259 A1 | 10/2002 | Gutta et al. |
| 2002/0156858 A1 | 10/2002 | Hunter |
| 2003/0018977 A1 | 1/2003 | McKenna |
| 2003/0041333 A1 | 2/2003 | Allen et al. |
| 2003/0056213 A1 | 3/2003 | McFaddin et al. |
| 2003/0063432 A1 | 4/2003 | Farrow et al. |
| 2003/0066080 A1 | 4/2003 | Kamieniecki |
| 2003/0072273 A1* | 4/2003 | Aiello et al. ............... 370/310.2 |
| 2003/0075983 A1* | 4/2003 | Stecyk et al. ................... 307/38 |
| 2003/0081834 A1 | 5/2003 | Philomin et al. |
| 2003/0161479 A1 | 8/2003 | Yang et al. |
| 2004/0015575 A1 | 1/2004 | Motoyama |
| 2004/0015983 A1 | 1/2004 | Lemmons |
| 2004/0024867 A1 | 2/2004 | Kjellberg |
| 2004/0049797 A1* | 3/2004 | Salmonsen ................... 725/132 |
| 2004/0119894 A1 | 6/2004 | Higgins et al. |
| 2004/0176117 A1 | 9/2004 | Strittmatter et al. |
| 2004/0210926 A1 | 10/2004 | Francis et al. |
| 2004/0244032 A1 | 12/2004 | Yamada |
| 2004/0264704 A1 | 12/2004 | Huin et al. |
| 2005/0005297 A1 | 1/2005 | Lee |
| 2005/0020262 A1 | 1/2005 | Kim |
| 2005/0022244 A1 | 1/2005 | Scheelke |
| 2005/0034147 A1 | 2/2005 | Best et al. |
| 2005/0034160 A1 | 2/2005 | Kim et al. |
| 2005/0108760 A1 | 5/2005 | Iwamura |
| 2005/0120381 A1 | 6/2005 | Yamaguchi |
| 2005/0132408 A1* | 6/2005 | Dahley et al. ................... 725/80 |
| 2005/0165795 A1 | 7/2005 | Myka et al. |
| 2005/0165965 A1 | 7/2005 | Henry et al. |
| 2005/0166241 A1 | 7/2005 | Kim et al. |
| 2005/0179618 A1 | 8/2005 | Oh |
| 2005/0188406 A1 | 8/2005 | Gielow et al. |
| 2005/0210101 A1 | 9/2005 | Janik |
| 2005/0216867 A1 | 9/2005 | Marvit et al. |
| 2005/0235329 A1 | 10/2005 | Karaoguz et al. |
| 2005/0240978 A1 | 10/2005 | Bowern et al. |
| 2005/0246746 A1 | 11/2005 | Yui et al. |
| 2005/0257052 A1 | 11/2005 | Asai et al. |
| 2005/0278462 A1 | 12/2005 | Gillespie |
| 2006/0020960 A1 | 1/2006 | Relan et al. |
| 2006/0031889 A1 | 2/2006 | Bennett et al. |
| 2006/0034469 A1 | 2/2006 | Tamiya et al. |
| 2006/0048194 A1 | 3/2006 | Poslinski |
| 2006/0050142 A1 | 3/2006 | Scott et al. |
| 2006/0053472 A1 | 3/2006 | Goto et al. |
| 2006/0064720 A1 | 3/2006 | Istvan et al. |
| 2006/0080408 A1 | 4/2006 | Istvan et al. |
| 2006/0085825 A1 | 4/2006 | Istvan et al. |
| 2006/0092037 A1 | 5/2006 | Neogi et al. |
| 2006/0105712 A1 | 5/2006 | Glass et al. |
| 2006/0107281 A1 | 5/2006 | Dunton |
| 2006/0142900 A1 | 6/2006 | Rothman et al. |
| 2006/0143572 A1 | 6/2006 | Scott et al. |
| 2006/0152477 A1 | 7/2006 | Noda et al. |
| 2006/0190974 A1 | 8/2006 | Lee |
| 2006/0236344 A1 | 10/2006 | Brain et al. |
| 2006/0247983 A1 | 11/2006 | Dalli |
| 2006/0248557 A1* | 11/2006 | Stark et al. ...................... 725/37 |
| 2006/0294537 A1 | 12/2006 | Weinblatt |
| 2007/0002784 A1 | 1/2007 | Edwards |
| 2007/0016931 A1 | 1/2007 | Ichioka et al. |
| 2007/0033607 A1 | 2/2007 | Bryan |
| 2007/0056000 A1 | 3/2007 | Pantalone et al. |
| 2007/0058820 A1 | 3/2007 | Sawara et al. |
| 2007/0121954 A1 | 5/2007 | Kim et al. |
| 2007/0124785 A1 | 5/2007 | Marsico |
| 2007/0136768 A1 | 6/2007 | Kumar |
| 2007/0136778 A1 | 6/2007 | Birger et al. |
| 2007/0142022 A1* | 6/2007 | Madonna et al. ............. 455/352 |
| 2007/0143801 A1* | 6/2007 | Madonna et al. ............... 725/80 |
| 2007/0156521 A1 | 7/2007 | Yates et al. |
| 2007/0199035 A1 | 8/2007 | Schwartz et al. |
| 2007/0250853 A1 | 10/2007 | Jain et al. |
| 2007/0250900 A1 | 10/2007 | Marcuvitz |
| 2007/0294556 A1 | 12/2007 | Wutka |
| 2008/0004954 A1 | 1/2008 | Horvitz |
| 2008/0022360 A1 | 1/2008 | Bacastow |
| 2008/0039086 A1 | 2/2008 | Gallagher et al. |
| 2008/0040759 A1* | 2/2008 | She et al. ......................... 725/81 |
| 2008/0072292 A1 | 3/2008 | Narjala |
| 2008/0092201 A1 | 4/2008 | Agarwal et al. |
| 2008/0120369 A1 | 5/2008 | Gustavsson |
| 2008/0120667 A1 | 5/2008 | Zaltsman |
| 2008/0130912 A1 | 6/2008 | Marlowe |
| 2009/0052688 A1 | 2/2009 | Ishibashi et al. |
| 2009/0256855 A1 | 10/2009 | Tran |
| 2009/0270085 A1 | 10/2009 | Jones et al. |
| 2010/0093286 A1 | 4/2010 | Noda et al. |
| 2012/0198499 A1 | 8/2012 | Louie et al. |

OTHER PUBLICATIONS

Web pages: Home Audio without the Wires, http://news.com.com/home+audio+without+the+wires/2100-1041_3-6142125.html, Dec. 12, 2006, 3 pgs.

Web page: Panasonic's SH-FX85 wireless sound system: thanks FCC, http://www.engadget.com/2007/01/19/panasonics-sh-fx85-wireless-sound-system-thanks-fcc, Jan. 19, 2007, 1 pg.

Web pages: *Apple—AirPort Express, Introducing Airport Express with AirTunes*, www.apple.com/airportexpress; Oct. 5, 2006; 4 pgs.

Web pages: *Logitech® Harmony® 890 Advanced Universal Remote*, www.logitech.com/index.cfm/products/detailsharmony Oct. 5, 2006; 2 pgs.

*AirPort Express, Technology Overview*, www.images.apple.com/airportexpress/pdfs. Jul. 2004; 31 pgs.

Web pages: *Linksys® WMCE54AG*, www.linksys.com/servlet/Satellite?c=L-Product, Oct. 5, 2006, 2 pgs.

*Logitech Innovation Brief, Dual Wireless Rear Speakers* www.logitech.com/lang/pdf/logitech_Z_5450_Speaker.pdf 2 pgs.

Web pages: *Sling Media—SlingPlayer*, www.us.slingmedia.com/page/slingplayer.html Oct. 5, 2006, 3 pgs.

Web pages: *Sonos, How Sonos Works*, www.sonos.com/productshow_sonos_works.html Oct. 5, 2006, 1 pg.

Web pages: *Sonos—Products*, www.sonos.com/products/index.html Oct. 5, 2006, 2 pgs.

Web pages: *Sonos—Sonos Setup*, www.sonos.com/products/sonos_setup.html Oct. 5, 2006, 1 pg.

(56) References Cited

OTHER PUBLICATIONS

Web pages: *Sonos—ZonePlayers*, www.sonos.com/zoneplayers Oct. 5, 2006, 1 pg.

Web pages: *SonyStyle USA—LocationFree Wireless Base Station*, www.sonystyle.com/is-bin/intershop.enfinity Oct. 20, 2006 2 pgs.

Web pages: *SonyStyle—Audio Video Receiver STR-DG800*, www.sonystyle.com/is-bin/intershop.enfinity Oct. 5, 2006, 3 pgs.

Web pages: *Logitecht® Z-5450 Digital 5.1 Speaker System*, www.logitech.com/index.cfm/products Oct. 5, 2006, 2 pgs.

Web pages: Press Release, *Tzero Teams with Analog Devices to Enable Wireless High-Definition Video*, Tzero Technologies, www.tzerotech.com/site/content/pr_106.html Oct. 5, 2006, 4 pgs.

Web pages: *X10 Audio Video Sender Internet Special*, www.x10.com/products/x30_vk30A.html Oct. 5, 2006, 9 pgs.

"Bluetooth Basics", www.bluetooth.com/Bluetooth/Technology/Basics.html, 2009.

Final Office Action issued by the United States Patent and Trademark Office on Nov. 22, 2013 in connection with U.S. Appl. No. 11/535,211, 33 pp.

Notice of Allowance from USPTO dated Jul. 3, 2013, U.S. Appl. No. 11/563,503, pp. 1-9.

Office Action issued by the United States Patent and Trademark Office dated Jan. 7, 2014 in reference to U.S. Appl. No. 11/563,366, 27 pp.

* cited by examiner

SOURCE DEVICE CHANGE USING A WIRELESS HOME ENTERTAINMENT HUB

CROSS REFERENCE TO RELATED APPLICATIONS

This application is continuation of U.S. patent application Ser. No. 11/470,862, entitled Data Presentation Using a Wireless Home Entertainment Hub, filed Sep. 7, 2006, the entire disclosure of which is incorporated herein by reference.

This application is related to co-pending U.S. patent application Ser. No. 11/535,211, entitled Device Registration using a Wireless Home Entertainment Hub, filed Sep. 26, 2006, U.S. patent application Ser. No. 11/535,216, entitled User Directed Device Registration using a Wireless Home Entertainment Hub, filed Sep. 26, 2006, U.S. patent application Ser. No. 11/470,872, entitled Control of Data Presentation using a Wireless Home Entertainment Hub, filed Sep. 7, 2006, U.S. patent application Ser. No. 11/470,879, entitled Data Presentation from Multiple Sources using a Wireless Home Entertainment Hub, filed Sep. 7, 2006, and U.S. application Ser. No. 11/470,895, entitled Control of Data Presentation from Multiple Sources using a Wireless Home Entertainment Hub, filed Sep. 7, 2006, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
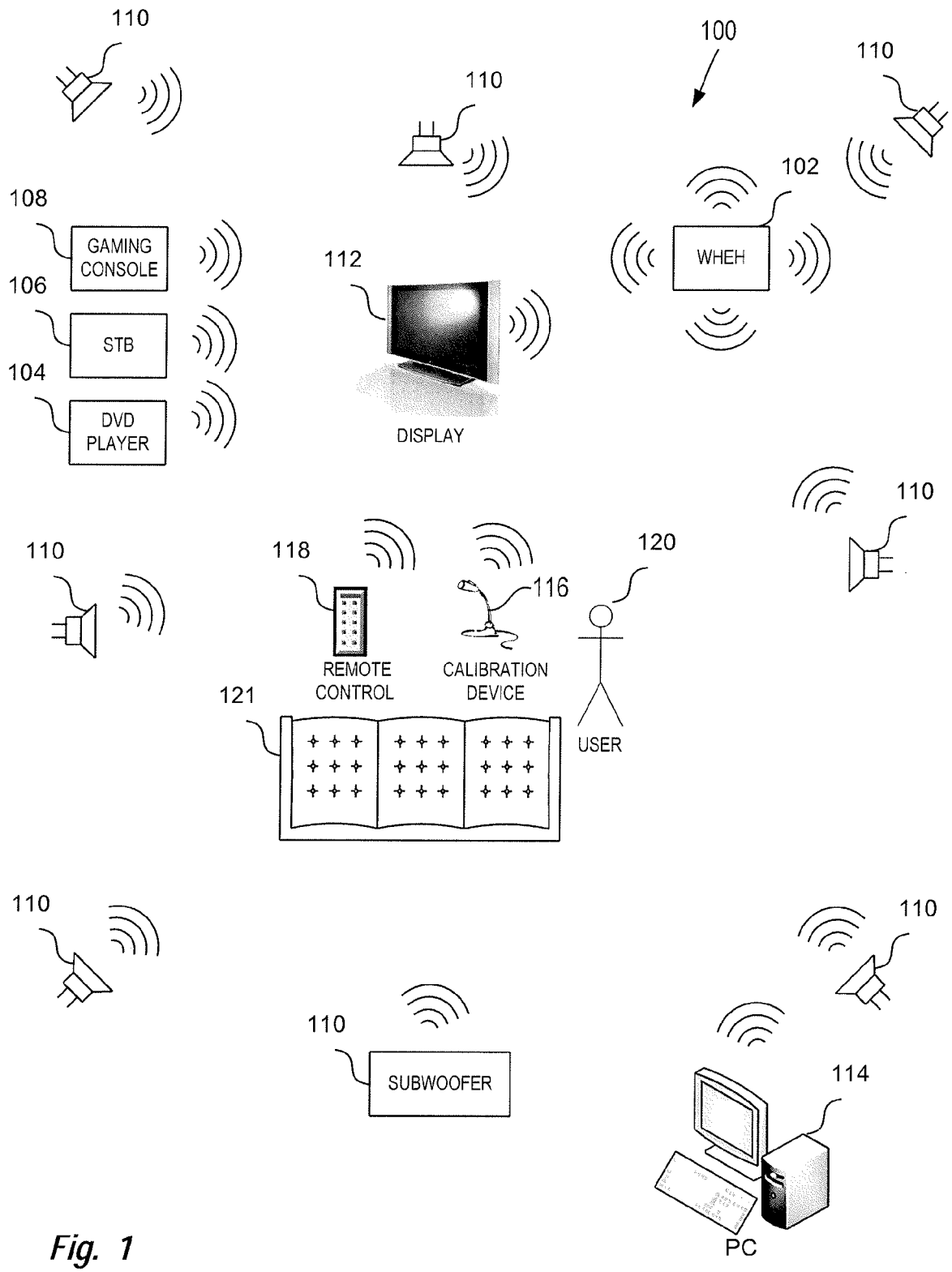
FIG. 1 is a system diagram of a home entertainment system according to one embodiment of the present invention.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the home entertainment system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing tie embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

An exemplary home entertainment system (HES) 100 including wirelessly connected devices in accordance with one embodiment of the present invention is shown in FIG. 1. Interactions between the various wireless devices in the HES 100 and a user 120 are coordinated by a wireless home entertainment hub (WHEH) 102. It is understood by those skilled in the art that a wireless device in the HES 100 may contain an external wire for the purpose of supplying power to the wireless device.

Figure 2:
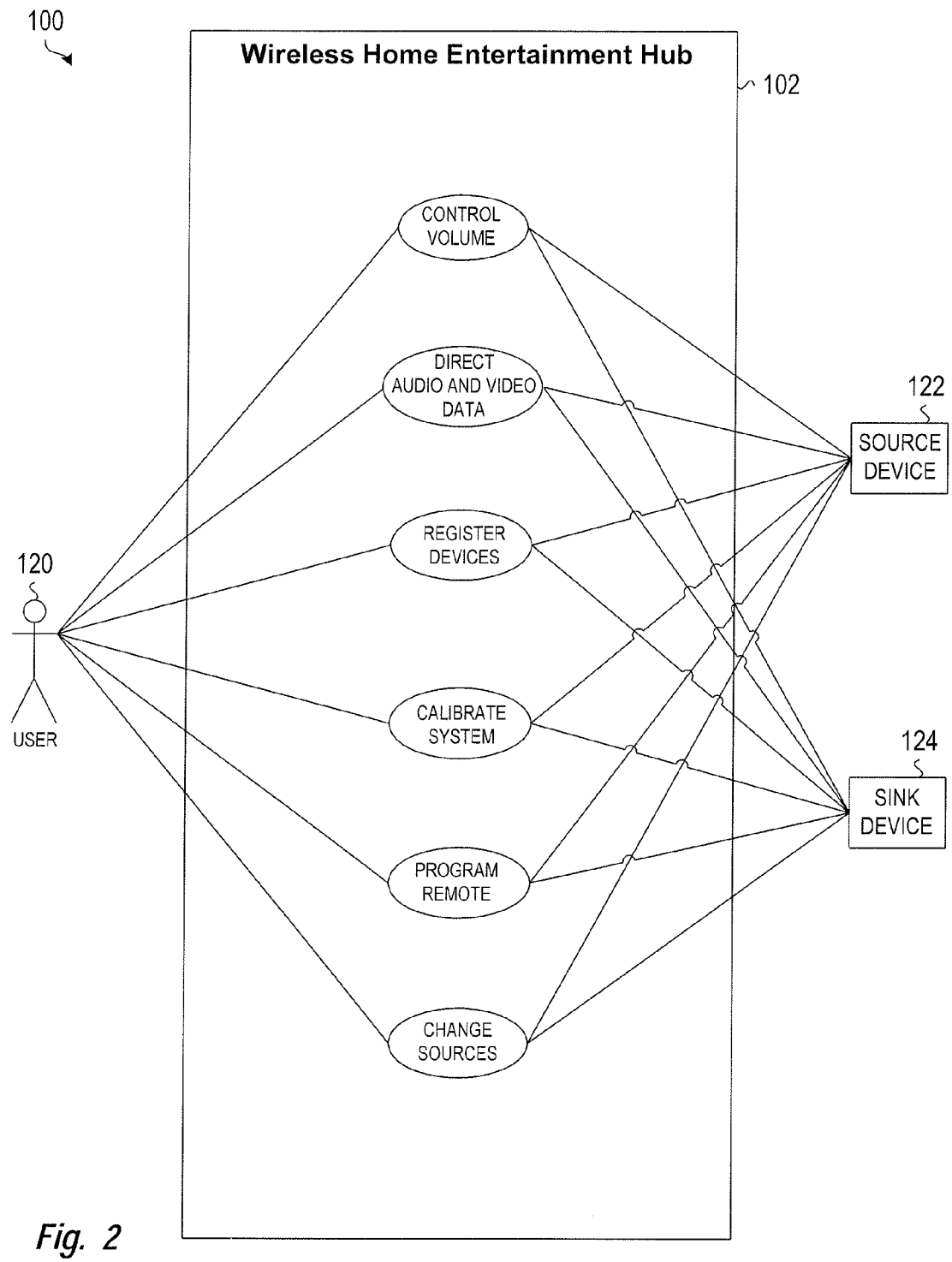
FIG. 2 is a use-case diagram of a wireless home entertainment hub in accordance with the home entertainment system of FIG. 1.

Referring generally to FIGS. 1 and 2, devices in the HES 100 can broadly be classified into two categories: source devices 122 and sink devices 124. Source devices 122 transmit data within the HES 100. Source devices 122 include, but are not limited to, DVD players 104, digital video recorders (DVR) (not shown), set-top boxes (STB) 106 (e.g., cable or satellite channel tuners), gaming consoles 108 (e.g. Xbox®, PlayStation®), CD players or other audio playback devices (e.g., MP3 player) (not shown). It is understood by those skilled in the art that external data can be introduced into the HES 100 for transmission by one or more of the source devices 122 by various means, such as optical fiber, co-axial cable, or a satellite dish system connected to the STB 106. Sink devices 124 receive the transmitted data within the HES 100, sometimes converting a signal into an audible or visible stimulus. Sink devices 124 include, but are not limited to, speakers 110, audio/visual receivers (AVR) 145 (see FIG. 9), and display devices 112 such as an HDTV or other television, monitor, or display screen or mechanism.

Those skilled in the art will recognize that a PC 114 can act as a source device 122 and/or a sink device 124 within the HES 100. The PC 114 can act as an audio and/or a video source transmitting data from, for example, a CD, DVD, stored music and video media, or data accessed from the Internet. The PC 114 can also act as a sink device 124 displaying video and audio data from, for example, the DVD player 104 or STB 106.

The HES 100 may also utilize a remote control 118 and a calibration device 116, discussed in greater detail below.

The WHEH 102 facilitates the transfer of data between the source and sink devices in the HES 100, as well as coordinates the interaction between the user 120 and the source and sink devices 122, 124. For example, referring to FIG. 2, the WHEH 102 may perform a register devices use-case, change source use-case, direct audio and video signal use-case, program remote use-case, control volume use-case, and calibrate system use-case, which are described in more detail below. Within the HES 100, the WHEH 102 controls the flow of data, information and other "traffic" by recognizing the devices within the HES 100, tracking their current status (e.g., active, standby, etc.), directing the transfer of data between devices, etc. In addition, the WHEH 102 provides a central controller for the HES 100 that allows a user 120 to operate tie HES 100 in an efficient manner through interaction with the WHEH 102, which then subsequently provides instructions to the other devices in the HES 100 to perform the function requested by the user 120. Such interactions with the WHEH 102 by the user may be performed through with a visual user interface presented on the screen of the display device 112. Alternately, the remote control 118 may include a display screen, such as an LCD, to present the user with a visual interface to the WHEH 102.

Figure 11:
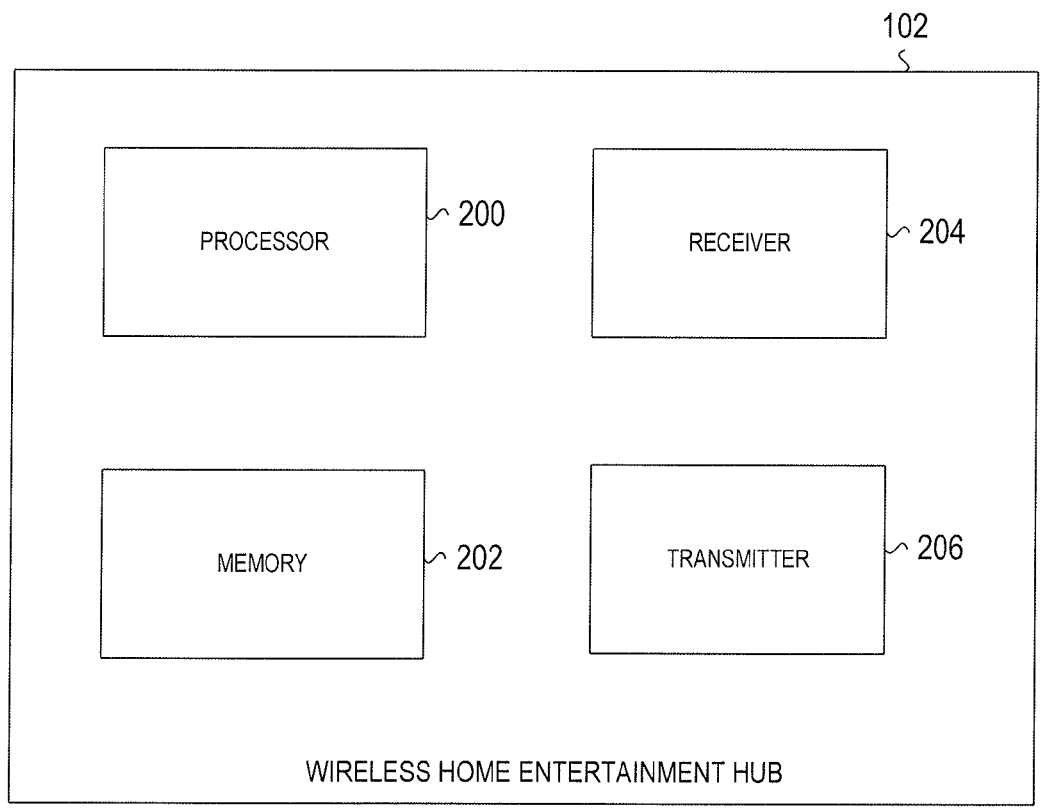
FIG. 11 is a block diagram of the wireless home entertainment hub in accordance with the home entertainment system of FIG. 1.

Referring to FIG. 11, the WHEH 102 includes one or more wireless transmitters 206 and receivers 204, or combined transmitter/receiver (i.e., transceiver) units to facilitate the wireless transfer of data between the source and sink devices 122, 124 using wireless communication standards described below, a memory 202 for storing data and other information generally used in the operation of the HES 100, and a processor 200 for executing the instruction sets for the functions performed by the WHEH 102, including the use-cases listed above. The WHEH 102 may exist as a standalone unit or it may be integrated into another device. For example, the WHEH may be included in the display device 112 or the remote control 118. One skilled in the art will recognize that the WHEH 102 can act as a source device 122 and/or a sink device 124 in the HES 100. For example, the WHEH 102 may receive data (i.e., acts as a sink unit) from a source unit currently transmitting data in the HES 100, and process and transmit that data (i.e., acts as a source unit) to other sink devices in the HES 100 for presentation to a user 120.

Ultra-wide band technology (UWB) utilizing orthogonal frequency division multiplexing (OFDM) or a direct sequence communication system may be used for the wireless communication between the WHEH 102 and the source and sink devices 122, 124 in the HES 100. Those skilled in the art will recognize that a number of other wireless commutation standards, including Bluetooth and various WiFi standards, can be used without departing from the spirit and scope of multiple embodiments of tie present invention for transfer of data between devices within the HES 100. In one embodiment, more than one wireless standard may be utilized within the HES 100 to facilitate data transfer between the devices. For example, the WHEH 102 and source and sink devices 122, 124 may each contain a UWB transceiver for transfer of audio and/or video data and a WiFi transceiver for transferring operation instructions.

Figure 3:
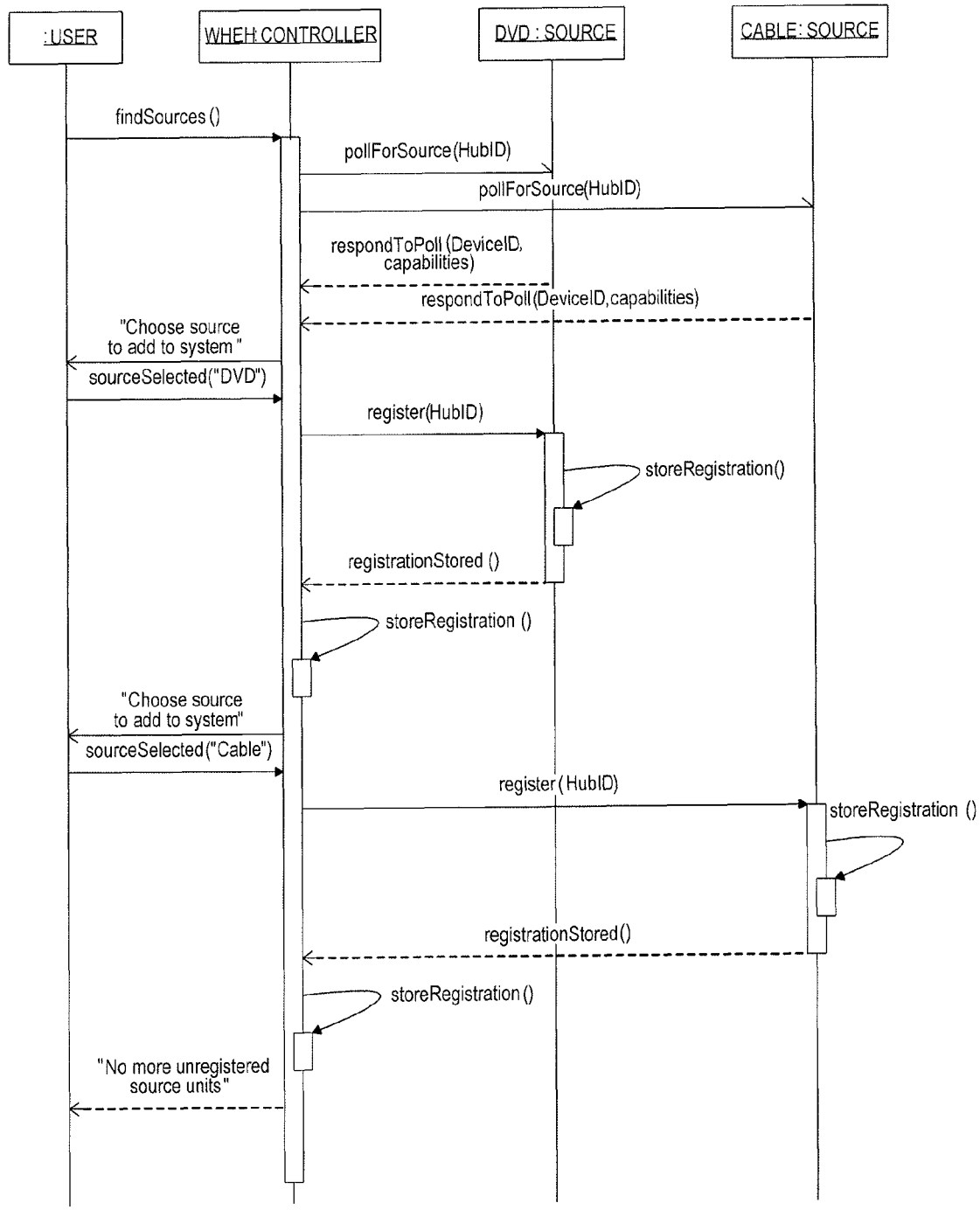
FIG. 3 is a sequence diagram of user-initiated automatic registration in accordance with the home entertainment system of FIG. 1.
Figure 4:
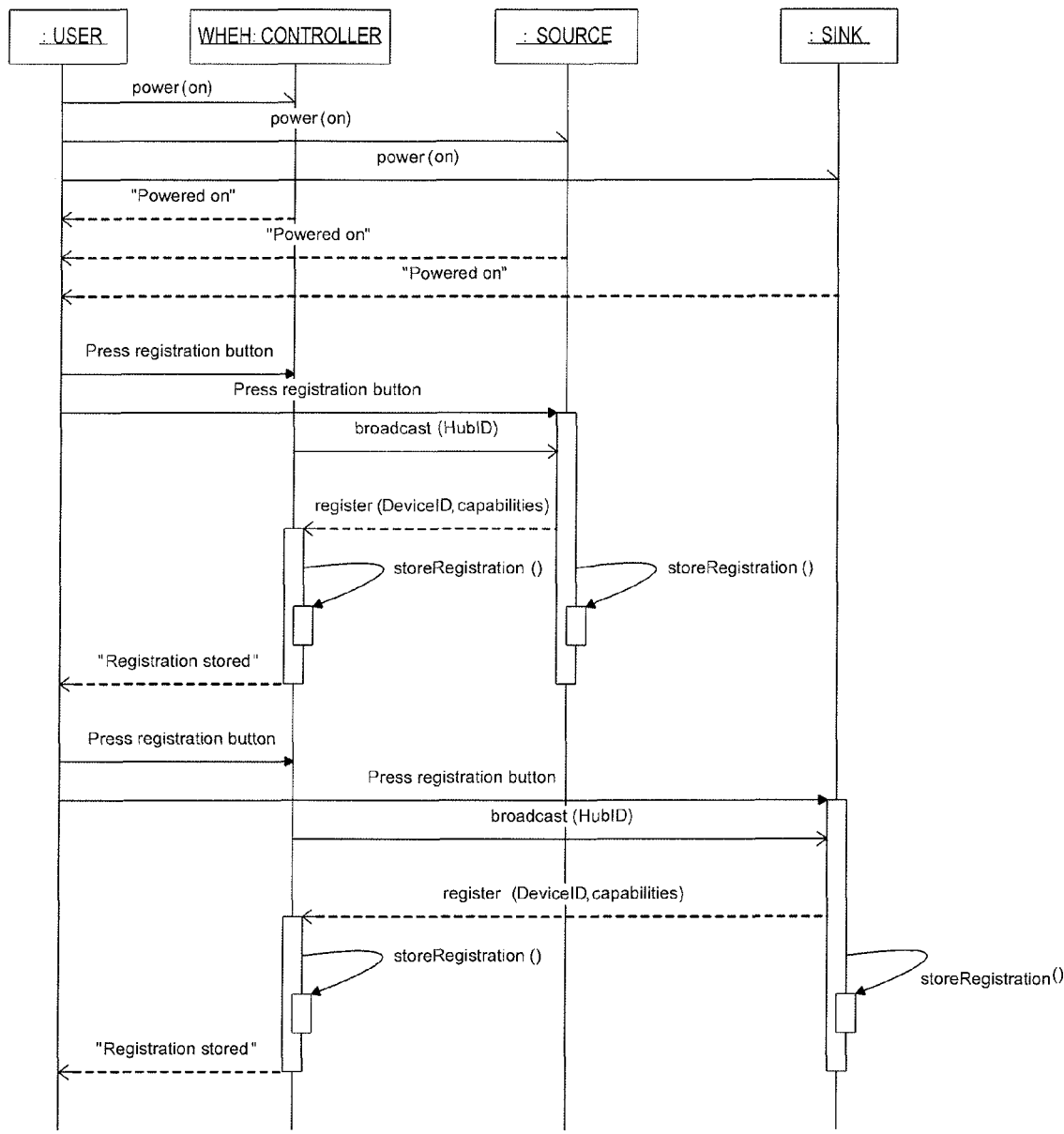
FIG. 4 is a sequence diagram of manual device registration in accordance with the home entertainment system of FIG. 1.

Referring generally to FIGS. 2-4, audio and video devices in the HES 100 can be registered with the WHEH 102. The registration creates a unique association between devices and the WHEH 102 such that registered devices belonging to the HES 100 are controlled by WHEH 102, and cannot simultaneously be registered with a different home entertainment system or another wireless home entertainment hub operating in a nearby proximity, such as in a neighboring apartment or household.

User-Initiated Automatic Registration

Referring to FIG. 3, the user 120 initiates the registration procedure. The WHEH 102 sends a request for any unregistered device to respond. The WHEH 102 request may include a unique identifier for the WHEH 1027 such as an WHEH ID number. A device response includes a unique device identifier, such as a device ID number. A list of responding devices is presented to the user 120, and the user 120 selects the device that is to be registered with WHEH 102. The WHEH 102 sends a registration instruction to the selected device and the registration is stored on both the device and the WHEH 102, Once a registration has been established, the device is removed from the list, and the registration process is repeated for the remaining unregistered devices within the HES 100 that have responded to the WHEH 102.

In an alternate embodiment, the registration procedure is accomplished automatically between the WHEH 102 and unregistered devices. For example, the WHEH 102 may periodically broadcast a request for any unregistered devices to report. In addition to replying with the device ID number, an unregistered device can respond with a list of its capabilities so that the WHEH 102 can determine the functionality of the device (i.e., if it is a DVD player, DVR, STB, etc.) before sending a registration instruction. Alternately, the unregistered device can respond with its make and model number from which the WHEH 102 can determine the functionality of the device using an internal database of devices and also obtain any necessary command codes for the device, Alternatively, the user 120 may initiate the broadcast for unregistered sources instead of having the WHEH 102 perform a periodic broadcast for unregistered sources. For example, when a user 120 adds a new component or device to the HES 100, a request to find unregistered sources may be initiated, such that once the request is initiated, the remaining registration procedure proceeds automatically as discussed above.

In an alternate embodiment, the WHEH 102 may automatically recognize and register all devices in tie HES 100. For example, a user 120 may purchase a set of coordinated devices for wireless HES 100 including, for example, a display, set of multi-channel speakers, a DVD player 104, and a WHEH 102 (which may be a discreet device or contained in one of the system devices, such as the display or remote control). Each of these coordinated devices may contain a coordinated ID that is recognizable by the WHEH 102. Additionally, the speakers may be labeled with their intended position within the HES 100 (e.g., front left, middle right) to aid the user 120 in their correct placement. Upon placement and power-up, without any additional actions by the user 120, the WHEH 102 automatically registers the coordinated devices based on their coordinated ID's that have been set by the device manufacturer.

The wireless HES 100 may perform an error checking during the registration of the source and sink devices to make sure that the device being registered matches the type of device being requested for registration. The WHEH 102 can compare the list of capabilities received from the device during the registration with a list of expected capabilities stored in the WHEH 102. If the capabilities in the device reply match the expected capabilities of the WHEH 102, an indication of the registration is stored in the WHEH 102 and the device. If the capabilities and expected capabilities do not match, the registration is not stored and may be re-initiated.

Manual Registration

The registration may also be performed manually by the user 120 (see FIG. 4). The user 120 initiates a registration procedure by pressing a registration actuator on the WHEH 102. Examples of actuators include buttons, touch pads, touch screens, or any other actuating assembly recognized by those skilled in the art. The user 120 presses a registration actuator on a selected source unit which sends a signal to the WHEH 102 that a registration should be stored with this unit. If the WHEH 102 is unable to determine the functionality of the source (e.g., DVR, DVD, etc), the user 120 may manually assign the functionality of tie source to complete the registration. For example, if the user 120 selects the registration actuators on the WHEH 102 and the DVD player 104, the WHEH 102 may cause "DVD registered" to be displayed if the selected source is recognized as a DVD player 104 by the WHEH 102. If the selected source is not recognized, the WHEH 102 may prompt the user 120 to select the type of source device from a list. Thus, in this case, the user 120 may select "DVD" in order to complete the registration. This process is repeated until all the unregistered sources have been registered with the WHEH 102, or similarly if a new source is added into an existing system. In other embodiments, the user 120 may initiate registration from a source device 122, a sink device 124, a remote control 118, or over a network.

Multi-Instance Device Registration

For device types where multiple instances of the device exist within the system 100 (e.g., speakers 110), a number of approaches can be used to identify each device's specific role. For speakers 110, the role of each speaker can be pre-identified by the manufacturer (e.g., "front-right", "subwoofer", etc.). The user-initiated automatic registration procedure described above could be used to register the speakers 110 with the WHEH 102 since the speaker 110 could identify itself for example, as the front left speaker, during the registration process. Alternatively, each speaker 110 could have a physical input that the user 120 could set to indicate the speaker's role (e.g. "front-left", "back-right-surround"). In another embodiment, the WHEH 102 could use one or more microphones within the HES 100 to elicit position and frequency response information, or the HES 100 could use other position detection technologies understood by those skilled in the art.

In another embodiment, each speaker 110 could have a registration actuator to be activated in response to a WHEH 102 prompt for a speaker playing a specific role. For instance, the WHEH 102 could prompt the user 120 for the front-left speaker and the user 120 could activate the registration actuator. Alternately, the user 120 may initiate the registration procedure by activating a registration actuator on the WHEH 102. The user 120 then presses a registration actuator on a speaker 110 and identifies the functionality of that speaker 110 within the audio system 100. For example, at the time of registration, the user 120 identifies the selected speaker as the left front, the repeats for right front, continuing until all the speakers 110 have been identified and registered. In one embodiment, the WHEH 102 may prompt the user 120 with a list or graphic display of speaker positions available. The user 120 first selects the speaker 110 to be registered and then presses the registration actuator on the selected speaker. In an alternate embodiment, the WHEH 102 may first prompt the user 120 to enter the number of speakers to be registered with the WHEH 102 and then select the appropriate speaker configuration to match. For example, if only four speakers 110 are selected, the WHEH 102 would not present the user 120 with a Dolby® Digital 7.1 speaker configuration, but a four speaker list of left and right front, and left and right rear.

Source Selection

Referring generally to FIGS. 2, 5-7, in addition to coordinating the registration of device within the HES 100 as described above, the WHEH 102 is also used to coordinate and/or control the state of the source and sink devices and the transfer of data from the source devices to sink devices during typical operation of the HES 100. Device states (also referred to as modes) may include "on", "off", "active", "low power", "standby", etc. Data may include instructions, audio/video programming, or any other information generally passed between or among source/silk devices. Some examples of typical operations that are common in the general utilization of the HES 100 by the user 120 are a request or action by the user 120 to activate a source (e.g., start watching programming from a cable broadcast) or initiate a change from one source device to another (e.g., discontinue watching programming from a cable broadcast to watching a movie on the DVD player). The request to activate a source device or to change from one source device to another can be accomplished in a several ways. The user may initiate the action though the use of the remote control 118, or interact directly with a source device. For example, when a user inserts a DVD into the DVD player 104, it automatically causes the WHEH 102 to activate the DVD player 104 (or initiate a source change as described below if another source is already active in the HES 100). In either case, once the request has been made by the user 120, the WHEH 102 completes the process as described below.

Figure 5:
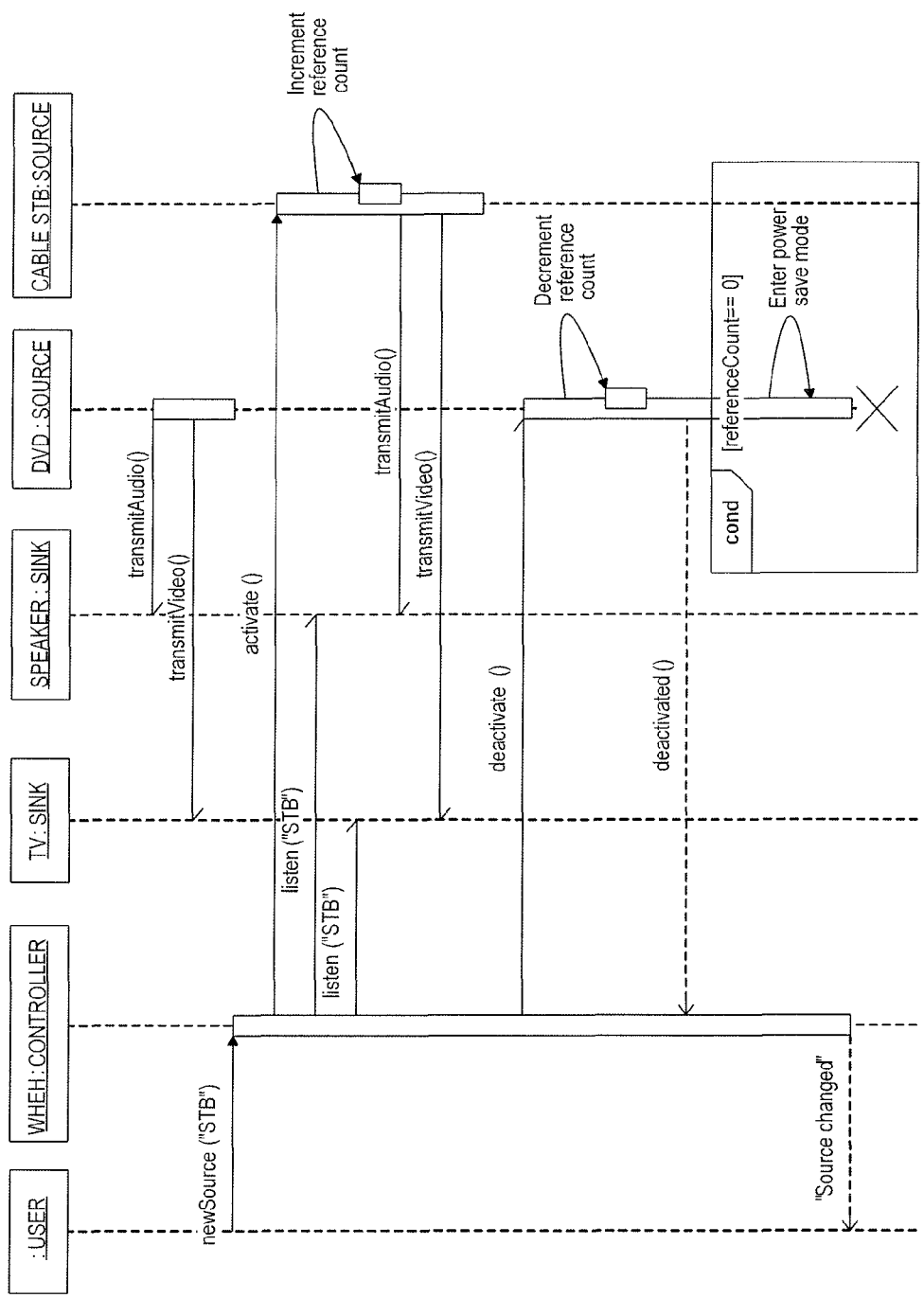
FIG. 5 is a sequence diagram of source activation in accordance with the home entertainment system of FIG. 1.

FIG. 5. is sequence diagram showing the selection of a source device 122 by the WHEH 102 in one embodiment of the HES 100. When a source device is activated, it begins transmitting data to the HES 100. The instruction to activate also causes an internal reference count within the source device to increment by one, where the reference count represents the current number of zones (described in more detail below) that are receiving data from the source device For example if the source device, currently in standby mode, is activated, its reference count increases to one. After a user 120 initiates a request to change to a new source, the WHEH 102 instructs the current active source device to decrement its internal reference count by one. When the active source device internal reference count is zero, the source device may stop transmitting and enter a low power or stand-by mode. If the internal reference count is not zero, the source device continues to transmit since there are other devices still listening to its transmission. The WHEH 102 then instructs the newly selected source unit to activate, including increasing its internal reference count by one, and the newly selected source device begins transmitting data to the HES 100. The sink devices may receive the transmitted data directly from the current active source or from the WHEH 100, both described below.

Direct Source to Sink Data Transmission

Figure 6:
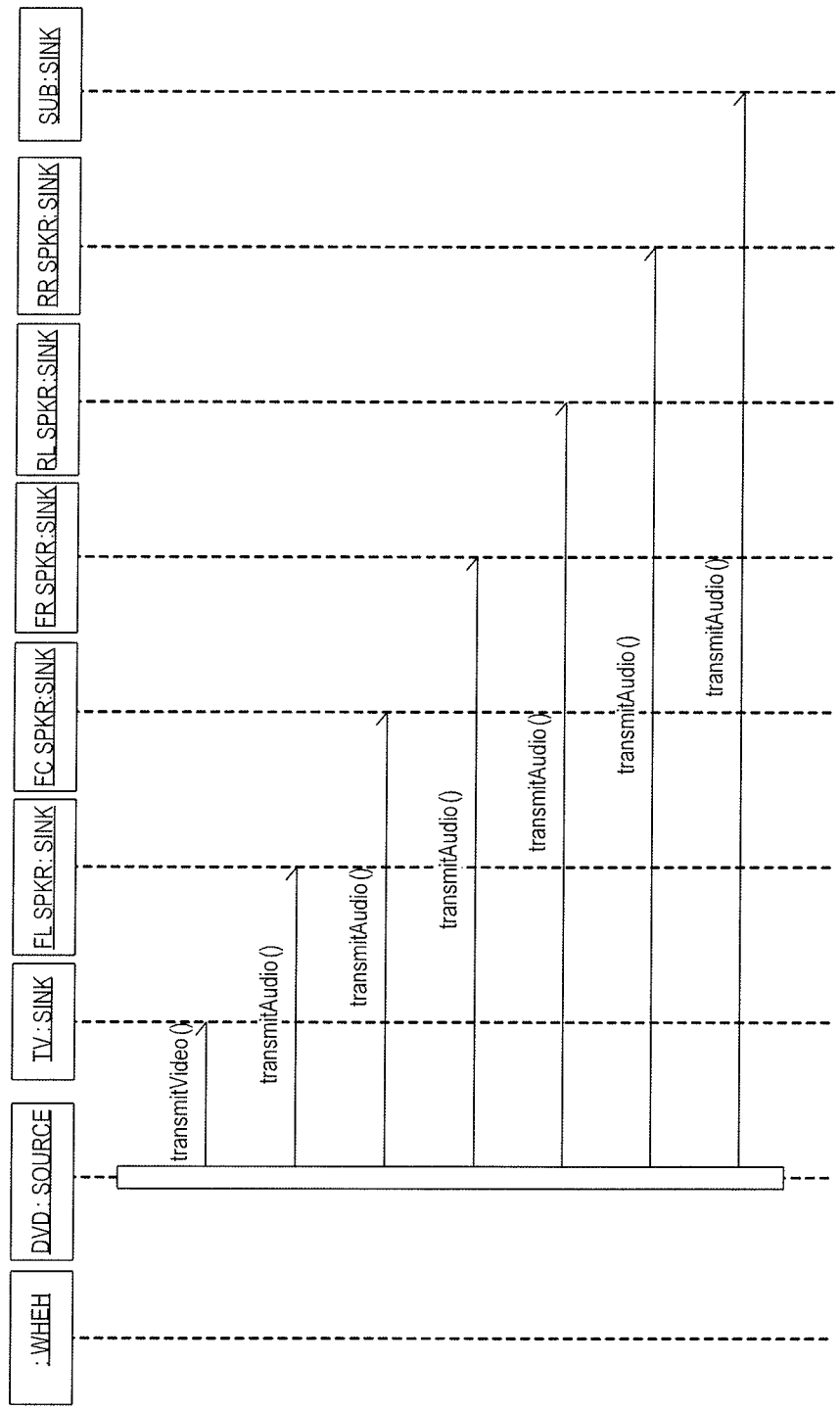
FIG. 6 is a sequence diagram of direct source to sink transmission of data within the home entertainment system of FIG. 1.

Referring to FIG. 6, after a source activation or change is initiated within the HES 100 as described above, the WHEH 102 broadcasts to all sink units, or those that are relevant, an instruction to discontinue receiving and transmitting data from the previously active source and begin receiving the transmitted data from the newly selected source, where the activities in FIG. 6. labeled "transmitVideo( )" and "transmitAudio( )" represent a continuous stream of data from the source device 122 to the sink devices 124. This instruction from the WHEH 102 may be broadcast as a single instruction to all units (i.e., a common instruction recognizable by any device in the HES 100) or may be a distinct instruction sent to each of the sink units. Audio and/or video data from the current active source device is transmitted directly to the relevant sink devices as instructed by the WHEH 102. For example, the display device 112 and speaker 110 receive and present the video data and audio data, respectively, from the current active source device. In one embodiment, tie newly selected source device that has been activated in the HES 100 may transmit one or more instructions directly to the sink units to begin receiving and presenting the data from the newly selected source and discontinue presenting the data from the previously active source.

Source to Sink Data Transmission Through the WHEH

Figure 7:
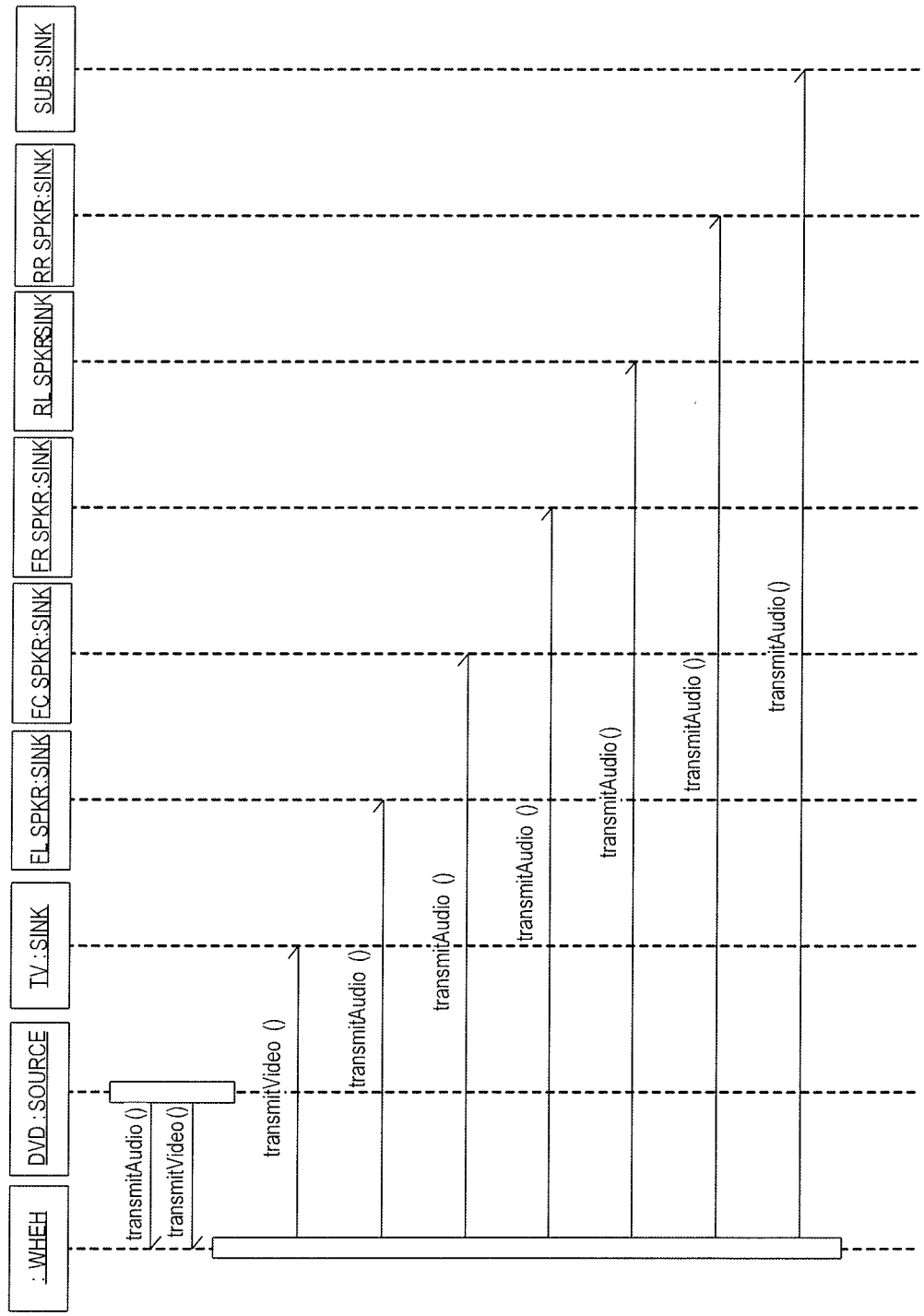
FIG. 7 is a sequence diagram of transmission of data directed by the wireless home entertainment hub within the home entertainment system of FIG. 1.

In an alternate embodiment, the sink units in the HES 100 receive data from the wireless home entertainment hub (see FIG. 7). The WHEH 102 receives the audio and video data from the current active source device and transmits the audio and video data to the appropriate sink unit. If a source change is initiated within the HES 100 as described above, the sink units may be unaware of a change of source with the HES 100 since they always listen to (i.e., receive data from) the WHEH 102, and not directly to the active source device.

In one embodiment, more than one source can be designed as an active source by the WHEH 102. Data from multiple active sources call be simultaneously presented by the relevant sink devices as described by the two methods above. The WHEH 102 receives the data from the two or more active source devices and transmits the data to the relevant sink devices. The WHEH 102 may process (e.g., mix) the data from the two or more source devices before transmitting. Alternately, the WHEH 102 may instruct the sink devices to listen to and present data transmitted directly from the two or more active sink devices.

Figure 8:
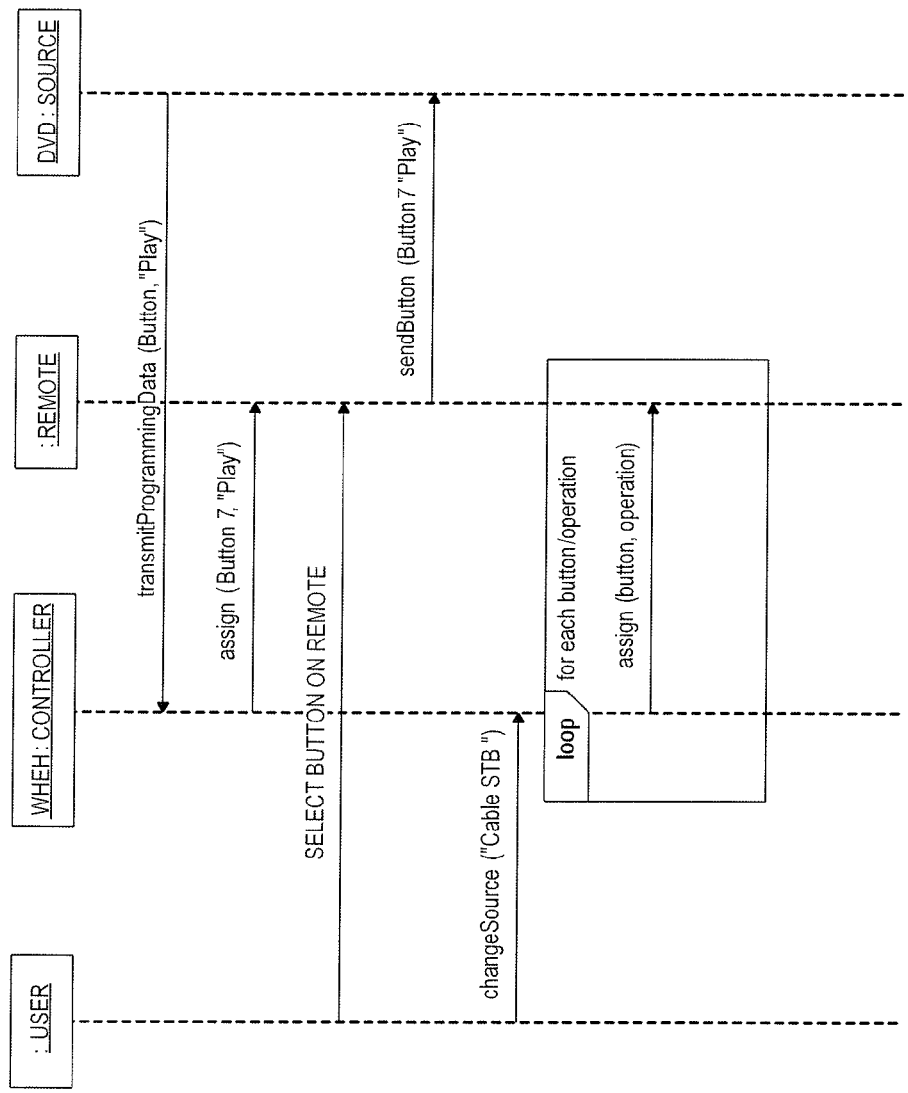
FIG. 8 is a sequence diagram of operation of a remote control in accordance with the wireless home entertainment system of FIG. 1.

Referring to FIG. 8, in one embodiment of the present invention, a remote control 118 is used with the HES 100. The remote control 118 receives actuator assignments based on the currently active source in the HES 100 from the WHEH 102. For example, if the DVD player 104 is currently the active source, the actuator assignment on the remote control 118 is for the DVD player 104. When a user 120 activates an actuator on the remote control 118, the actuator selection is sent directly to the DVD player 104, which responds with the corresponding activity for that actuator. If the user 120 initiates a source change through the WHEH 102 as described above, (e.g. from the DVD player 104 to the set-top tuner), then the WHEH 102 sends a new actuator assignment to the remote control 118 for the set-top tuner. Actuators activated on the remote control 118 by a user 120 now cause an activity in the set-top box instead of the DVD player 104. This method of operation of the remote control 118 is referred to a "dumb" remote. The functionality of the actuators on the remote control is controlled by the WHEH 102 based on the current active source in the HES 100. The remote does not need to store any information about past or present states of the HES 100 or registration information between the devices in the HES 100.

In an alternate embodiment, a "smart" remote may be used in conjunction with the HES 100. The smart remote learns and stores the system configuration, i.e., what source and sink devices are registered with the WHEH 102. It also learns and stores the current state of the system, i.e., what sources and sinks are active. In addition, the smart remote stores the actuator assignments in an internal memory and may store system status information along with device registration information. When a user 120 requests a source change using the remote, the WHEH 102 activates the new source as describe above, and the functionality of the remote control 118 is switched to controlling the newly active source without any input from the WHEH 102 to re-assign the actuators as described in the dumb remote case above. In one embodiment, the WHEH 102 may be contained in the smart remote instead of the display device 112.

A handheld mobile device, such as cellular phone or personal digital assistant, can use appropriate wireless capabilities to communicate with a WHEH 102, obtain information to build and present a user interface, and serve as a remote control 118 for the HES 100. In addition, the capabilities of the HES 100 may be used to enhance the functionality of the handheld mobile device. For example, when a cellular phone is active the remote control 118, the active display device 112 may display CallerID information or other information generally presented on the cellular phone display to the user 120 during an incoming telephone call.

The WHEH 102 may respond to voice commands. A user 120 can perform some or all of the functionality of the remote control 118 by using simple audible commands. For example, to change the STB to channel 21, the user 120 might say "Channel 21" and the WHEH 102 sends the corresponding instruction to the STB to complete the channel change, or use the command "Volume Up" increase the system volume, where the WHEH 102 send instructions to the active sink unit to increase volume.

Power Management

At startup of an entertainment session, a user 120 may direct a power-on message to the WHEH 102, via a remote control 118 or perhaps via an actuator on the WHEH 102 or device containing WHEH 102 functionality. The WHEH 102 can then retrieve input from the user 120 regarding the capabilities required for the session and send activation messages to appropriate devices.

In another embodiment, a source device 122 can send a broadcast message to the sink devices 124 in the home entertainment network indicating required presentation capabilities. Required devices can activate themselves and unneeded devices can enter a low-power state. For example, all devices in the system are in a lower power mode. The user inserts a DVD into the DVD player 104 which causes the DVD to become active. The WHEH 102 detects the activity of the DVD player 104 and instructs the display device 112 and speakers 110 to activate. Alternately, the display device 112 and speakers detect the activity of the DVD player 104 directly and activate.

In one embodiment, upon indication from the active source device of the required audio output channels, the WHEH 102 sends signals to the audio sink devices to indicate whether or not they should remain active. For instance, upon indication of a Dolby® Digital 2.1 program, the WHEH 102 may communicate to the side and rear speakers that they may enter a low power mode. Similarly, when an audio-only program is indicated, for example from the CD player, the WHEH 102 can communicate to the video display device 112 that it may enter a low power non-display state.

Devices in the HES 100 may contain low-powered radios (i.e., transceivers) that poll for activity or constantly monitor for WHEH 102 messages during a low-power device state. Wireless radios conforming to the "ZigBee" standards can be used in some embodiments. "Bluetooth" or "WiFi" radios can be used in other embodiments. Modes of "UWB" can also be used to detect communications during low-power operations.

Volume Control

Volume control, including system muting, can be accomplished in multiple ways. In one embodiment, all active audio sink devices may individually detect that the remote control 118 has transmitted an instruction to change the volume. For instance, the eight speakers of a 7.1 surround sound system each detect a "volume up" instruction transmitted from the remote control 118. Each speaker then increases the gain on its internal amplifier, thereby driving the speaker to higher volume. Alternatively, the WHEH 102 can detect an instruction from the remote control 118 requesting a volume change and transmit to all the audio sink devices one or more instructions to change their volume.

System Calibration

For calibration of the HES 100, a wireless calibration device 116 may be placed at a typical viewing and/or listening position 121 (e.g., near or on a chair or couch that a user 120 would sit to view the television) of the HES 100 by the user 120 (see FIG. 1). For audio calibration, the WHEH 102 could direct a calibration signal to each audio device in sequence or in combination, or each audio device could be directed to generate its own calibration program. A microphone in the wireless calibration device 116 monitors the calibration signals from the audio devices, and can communicate its readings to the WHEH 102 or back to the audio devices in a point-to-point or broadcast mode. Adjustments could then be made to the frequency characteristics, volume, or other parameters to provide a calibrated home theater environment. Similarly, a wireless light sensitive device could be used to monitor a calibration signal from one or more display devices 112 to provide video calibration of the system. In one embodiment, the microphone and light sensitive device may be contained in a single calibration unit. Alternately, the microphone and light sensitive may be contained in separate calibration units. In one embodiment, an actuator on the microphone device could cause the device to communicate with the hub to initiate the calibration sequence.

A/V Receiver

Figure 9:
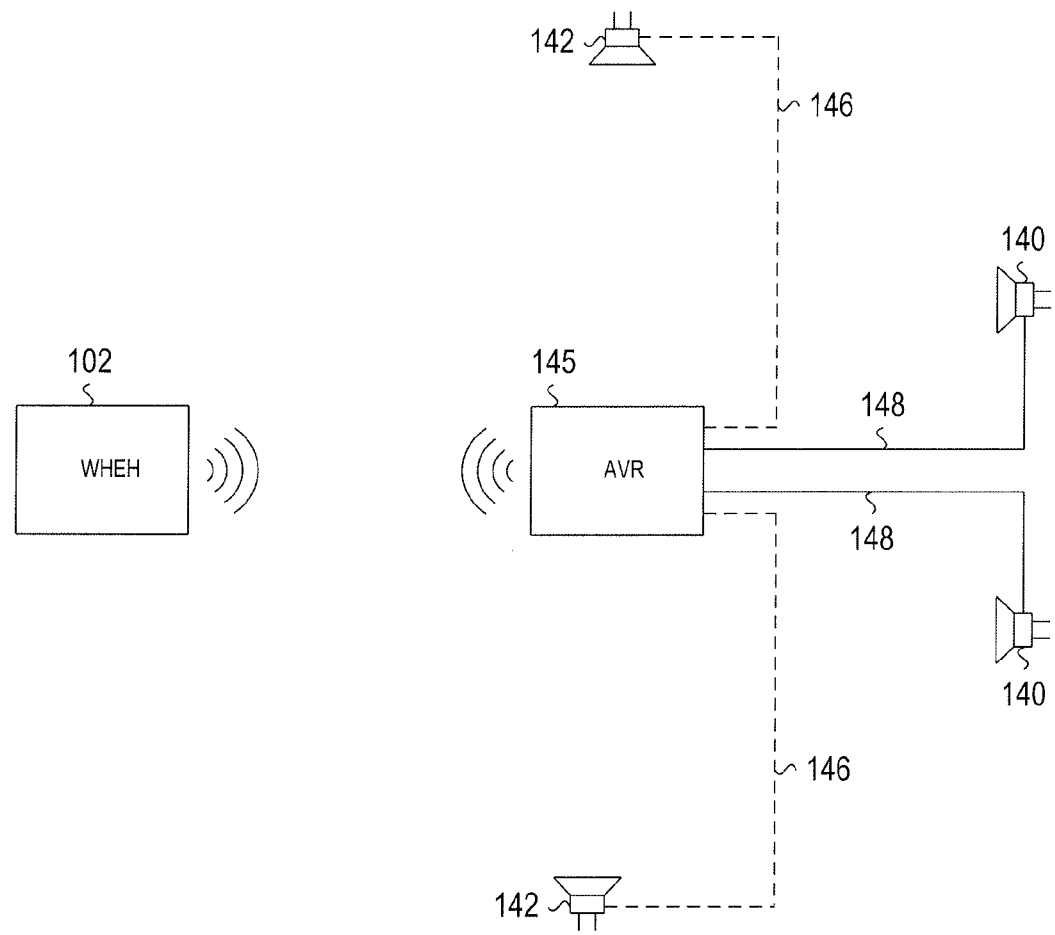
Fig. 9 is a system diagram of an audio/visual receiver used to connect speakers to the wireless home entertainment hub of FIG. 1.

Referring to FIG. 9, one or more audio/visual receivers (AVR) 145 or amplifiers can be used to connect the HES 100 to speaker system. The speaker system may be wired 140, wireless 142 or a combination thereof. For example, the front speakers 142 in a four speaker system may be wirelessly connected 146 to the AVR 145, while the rear speakers 140 are connected by a wire 148 to the AVR 145. The AVR 145 is registered with the WHEH 102 and receives audio data from an active source (not shown) or through the WHEH 102, as described above. The AVR 145 transmits the received audio data to the appropriate speakers 140, 142, either through the wired connection 148 or by wireless communication 146. It should be noted that if the AVR 145 is configured for use with wireless speakers 142, these wireless speakers 142 are not registered with the WHEH 102 as described above and do not receive data from the WHEH 102 or source devices 122 in the HES 100, but instead communicate with the AVR 145 using methods understood by those skilled in the art.

Legacy Adaptor

Figure 10:
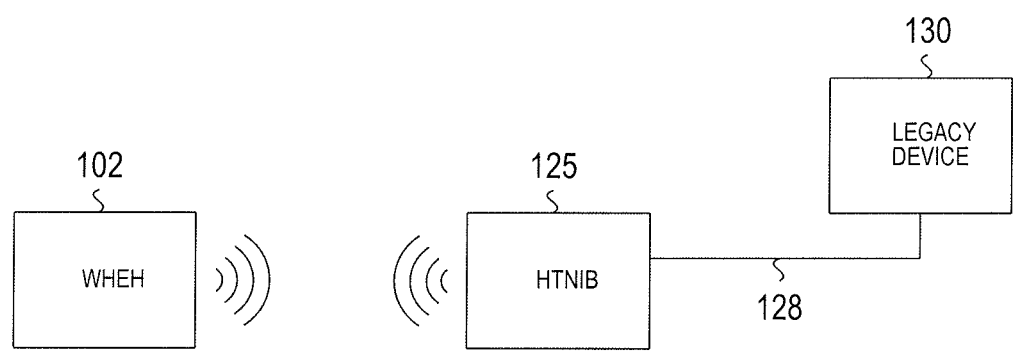
FIG. 10 is a system diagram of a home theatre network interface box used to connect legacy devices to the wireless home entertainment hub of FIG. 1.

Referring to FIG. 10, a home theatre network interface box (HTNIB) 125 may be used to connect "legacy" devices 130 into the HES 100, including the WHEH 102. Legacy devices generally include those devices that require hardwire connection for transmission and/or receipt of data and are not wireless enabled (e.g., an analog television connected to a set-top box using coaxial cable). The legacy device is connected to the HTNIB 125 using a hardwire connection 128 (e.g. coaxial cable). The HTNIB 125 is capable of being registered with the WHEH 102, and recognized by the WHEH 102 as the legacy device to which it is connected. The WHEH 102 directs data to and/or from the HTNIB 125 as appropriate to the type of legacy device to which the HTNIB 125 is connected. The HTNIB 125 passes data to and/or from the connected legacy device as required by the current configuration of the HES 100. For example, if a video cassette recorder (VCR) is connected to the HTNIB 125, the WHEH 102 will recognize the NTNIB 125 as a VCR, and when the user 120 selects the source unit VCR, will instruct the sink devices 124 in the HES 100 to listen to the transmission from the NTNIB 125, which is transmitting the data received from the cable connected to the VCR. One or more HTNIBs 125 could be used in the HES 100 to connect one or more legacy devices. In one embodiment, a single HTNIB 125 could used to connect one or more legacy devices to the HES 100, wherein the HTNIB 125 contains one or more connections for sink and source devices. Each connection can be uniquely registered with the WHEH 102.

Multi-Zone Operation

A single WHEH 102 may provide programming to multiple sets of sink devices that are registered with the WHEH 102. The HES 100 may be partitioned into one or more zones. Each sink device 124 in the HES 100 can be assigned to a zone. Zone assignment may be performed at the time of device registration with the WHEH 102. Zone assignment or changing zone assignments can also be accomplished at any time after device registration. An example of zone partitions within a HES 100 is that zone 1 includes the display device and 7.1 speaker system in the living room; zone 2 includes a display device in the bedroom; zone 3 includes an AVR 145 connected to speakers in the kitchen; and zone 4 includes a PC 114 in the home office. Multi-zone operation allows users 120 in different partitions of the HES 100 to received data from different source devices 122 registered with the WHEH 102. For instance, the sink devices in zone 1 are presenting the program from an HD-DVD, while the speakers in the kitchen connected to the AVR 145 in zone 3 are presenting audio from a wireless music storage device that is also registered with the WHEH 102.

In one embodiment, the WHEH 102 can receive an audio source signal containing more channels than can be presented in the current HES 100 (e.g., the audio signal is configured for a 7.1 system, but the installed HES 100 utilizes a 5.1 speaker configuration.) The WHEH 102 can process and downmix the audio signal for presentation on the available speaker configuration.

Systems using a WHEH 102 can be supplied in a low-security configuration to ease installation by non-technical users. In an embodiment with higher security, the user 120 can enter a code on one device and confirm the code on another device or on the user interface. In another embodiment, various system components can ship with awareness of unique identifiers of other devices in the system.

The WHEH 102 may be used to wirelessly connect musical devices. Musical source devices and musical sink devices can be connected to a mixing board containing an advanced embodiment of the WHEH 102. Musical source devices include, but are not limited to, musical instruments, microphones, effects systems, and amplifiers. Musical sink devices include by are not limited to speakers, and audio monitors. The mixing board acts as both a sink unit and source unit, and is a convenient location for placement of the WHEH 102. The musical devices are all be registered with the WHEH 102 similar to the produce procedure described above for the HES 100.

The WHEH 102 may detect the specific user or users of the HES 100 through RFID, image capture and analysis, or other personal identification technologies understood by those skilled in the art. In one embodiment, the remote control 118 may be equipped with a fingerprint scanner used for identification of the user 120. The identification of the user 120 can be used to control access to various devices of the HES 100 based on a set of rules customizable for each user of the HES 100 by an authorized user (i.e., parent). For example, access to one or more devices can be denied based on time of day. Similarly, access to certain programming channels can also be denied based on a television program rating system, time of day, or selected channels. For example, users identified as children may not be allowed access to an Xbox® gaming console before 5 PM on weekdays or may not be allowed to view channels showing television programming rated TV-MA (under the US TV Parental Guidelines).

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

I claim:

1. A method of changing, by a wireless home entertainment hub in a home entertainment system, from presentation of first data corresponding to a first source device to presentation of second data corresponding to a second source device, wherein the first source device is presently transmitting the first data and the first data is being presented by one or more of a plurality of sink devices, the method comprising:

registering a plurality of devices with the wireless home entertainment hub, the plurality of devices including the first source device, the second source device, and the one or more plurality of sink devices;

partitioning the plurality of sink devices into a plurality of zones by assigning each of the plurality of sink devices to one of the plurality of zones when the respective one of the plurality of sink devices is registered with the wireless home entertainment hub;

storing by the wireless home entertainment hub indications of the registrations with each of the plurality of devices;

receiving, by the wireless home entertainment hub, a selection of the second source device;

transmitting, by the wireless home entertainment hub, to the second source device an instruction to activate, wherein the one or more of the plurality of the sink devices comprises a first sink device in a first zone changed from presentation of the first data to presentation of the second data in response to an activation of the second source device, the first zone comprising a plurality of first zone sink devices;

transmitting, by the wireless home entertainment hub, to the first source device an instruction to decrement a first reference count upon determining no first zone sink device is currently presenting the first data, wherein the first reference count is an indication of a number of the zones receiving the first data from the first source device; and transmitting, by the wireless home entertainment hub, to the second source device an instruction to increment a second reference count upon determining no first zone sink device other than the first sink device is currently presenting the second data, wherein the second reference count is an indication of a number of zones receiving the second data from the second source device.

2. The method of claim 1, further comprising:
transmitting the second data from the second source device to the one or more sink devices for presentation of the second data from the second source device.

3. The method of claim 1, further comprising:
receiving, by the wireless home entertainment hub, the second data from the second source device; and
transmitting, by the wireless home entertainment hub, the second data to the one or more sink devices for presentation of the second data.

4. The method of claim 3, wherein the wireless home entertainment hub transmits to each of the one or more sink devices at least part of the second data received from the second source device.

5. The method of claim 1, wherein the first source device enters a low power mode when the first reference count indicates no zones are receiving the first data from the first source device.

6. The method of claim 5, wherein no zones are receiving the first data from the first source device when the first reference count is zero.

7. The method of claim 1, wherein the first and second source devices are wireless devices.

8. The method of claim 1, wherein the one or more of the plurality of sink devices is a wireless devices.

9. The method of claim 1, wherein the changing from the first source device to the second source device is initiated by a user based on an instruction received by the wireless home entertainment hub.

10. The method of claim 1, wherein the changing from the first source device to the second source device is initiated based on action on the second source device by a user.

11. The method of claim 1, wherein the indications of the registrations with each of the plurality of devices are stored in the respective devices.

12. The method of claim 1, wherein registering the plurality of devices prevents the plurality of devices from registering with a different wireless home entertainment hub while simultaneously being registered with the wireless home entertainment hub.

13. The method of claim 12, wherein registering the plurality of devices permits exchange of the first data and the second data between the plurality of devices and the wireless home entertainment hub, and facilitates direct transfer of the first data and the second data between the plurality of devices in response to receiving instructions from the wireless home entertainment hub and without the first data and the second data being received by and re-transmitted from the wireless home entertainment hub.

14. A method of changing, by a wireless home entertainment hub in a home entertainment system, from presentation of first data corresponding to a first source device to presentation of second data corresponding to a second source device, wherein the first and second source devices are each registered with the wireless home entertainment hub and the first source device is presently transmitting the first data and the first data is being presented by at least one of a plurality of sink devices, the method comprising:

registering each of the plurality of sink devices with the wireless home entertainment hub;

partitioning the plurality of sink devices into a plurality of zones by assigning each of the plurality of sink devices to one of the plurality of zones when the respective one of the plurality of sink devices is registered with the wireless home entertainment hub;

storing by each of the plurality of sink devices an indication of the registration with the wireless home entertainment hub;

receiving, by a first sink device in a first zone, the first data directly from the first source device, the first zone comprising a plurality of first zone sink devices;

receiving, by the first sink device, one or more instructions from the wireless home entertainment hub to receive the second data transmitted from the second source device and to discontinue receiving the first data transmitted from the first source device;

receiving, by the first sink device, the second data directly from the second source device, wherein an instruction to decrement a first reference count is transmitted from the wireless home entertainment hub to the first source device upon determining no first zone sink device is currently presenting the first data and an instruction to increment a second reference count is transmitted from the wireless home entertainment hub to the second source device upon determining no first zone sink device other than the first sink device is currently presenting the second data, wherein the first reference count is an indication of a number of the zones receiving the first data from the first source device and the second reference count is an indication of a number of the zones receiving the second data from the second source device.

15. The method of claim 14, wherein the at least one of the plurality of sink devices includes a plurality of wireless speakers for presenting audio data.

16. The method of claim 14, wherein the plurality of sink devices includes a display device for displaying video data.

17. The method of claim 16, wherein the wireless home entertainment hub is included in the display device.

18. The method of claim 14, wherein the one or more instructions comprises a single instruction broadcast to the at least one of the plurality of sink devices.

19. The method of claim 14, wherein the one or more instructions comprises a separate instruction transmitted to each of the at least one of the plurality of sink devices.

20. The method of claim 14, wherein the first and second source devices are wireless devices.

21. The method of claim 14, wherein the at least one of the plurality of sink devices is a wireless device.

22. The method of claim 14, wherein the indication of the registration is stored in the wireless home entertainment hub.

23. The method of claim 14, wherein registering each of the plurality of sink devices prevents each of the plurality of sink devices from registering with a different wireless home entertainment hub while simultaneously being registered with the wireless home entertainment hub.

24. The method of claim 23, wherein registering each of the plurality of sink devices allows direct transfer of the first data and the second data between the plurality of sink devices and the first and second source devices, respectively, both registered with the wireless home entertainment hub, in response to receiving instructions from the wireless home entertainment hub and without the first data and the second data being received by and re-transmitted from the wireless home entertainment hub.

25. A method of changing, by a wireless home entertainment hub in a home entertainment system, from presentation of first data corresponding to a first source device to presentation of second data corresponding to a second source device, wherein the first source device is presently transmitting the first data and the first data is being presented by at least one of a plurality of sink devices, the method comprising:

registering each of the plurality of sink device devices with the wireless home entertainment hub;

partitioning the plurality of sink devices into a plurality of zones by assigning each of the plurality of sink devices to one of the plurality of zones when the respective one of the plurality of sink devices is registered with the wireless home entertainment hub;

storing by each of the plurality of sink devices an indication of the registration with the wireless home entertainment hub;

receiving, by a first sink device in a first zone, the first data from the first source device, the first data from the first source device being transmitted via the wireless home entertainment hub, the first zone comprising a plurality of first zone devices; and receiving, by the first sink device, the second data from the second source device, the second data from the second source device being transmitted via the wireless home entertainment hub, wherein the second data from the second source device is received by the first sink device after a request for a change from the first source device to the second source device is received by the wireless home entertainment hub, an instruction to decrement a first reference count is transmitted from the wireless home entertainment hub to the first source device when the second data is received by the first sink device and upon determining no first zone sink device is currently presenting the first data, wherein the first reference count is an indication of a number of the zones receiving the first data from the first source device, wherein an instruction to increment a second reference count is transmitted from the wireless home entertainment hub to the second source device upon determining no first zone sink device other than the first sink device is currently presenting the second data, wherein the second reference count is an indication of a number of the zones receiving the second data from the second source device.

26. The method of claim 25, wherein the at least one of the plurality of sink devices includes a plurality of wireless speakers for presenting audio data.

27. The method of claim 25, wherein the at least one of the plurality of sink devices includes a display device for displaying video data.

28. The method of claim 27, wherein the wireless home entertainment hub is included in the display device.

29. The method of claim 25, wherein the request is initiated by a user.

30. The method of claim 25, wherein the at least one of the plurality of sink devices is a wireless device.

31. The method of claim 25, wherein the indication of the registration is stored in the wireless home entertainment hub.

32. The method of claim 25, wherein registering each of the plurality of sink devices prevents each of the plurality of sink devices from registering with a different wireless home entertainment hub while simultaneously being registered with the wireless home entertainment hub.

33. The method of claim 32, wherein registering each of the plurality of sink devices allows direct transfer of the first data and the second data between the plurality of sink devices and the first and second source devices, respectively, both registered with the wireless home entertainment hub, in response to receiving instructions from the wireless home entertainment hub and without the first data and the second data being received by and re-transmitted from the wireless home entertainment hub.

34. A wireless home entertainment hub to change from presentation of first data corresponding to a first source device to presentation of second data corresponding to a second source device in a home entertainment system, wherein the first source device is presently transmitting the first data and the first data is being presented by at least one of a plurality of sink devices, the wireless home entertainment hub comprising:
- a memory configured to store indications of registrations with each of a plurality of devices including the first source device, the second source device, and the plurality of sink devices,
- the memory further configured to store an indication of the first source device presently transmitting data, and a zone assignment for each of the plurality of sink devices, wherein the zone assignment for each of the plurality of sink devices indicates one of a plurality of zones to which the respective one of the plurality of sink devices is assigned, wherein a first zone comprises a plurality of first zone sink devices;
- a receiver configured to receive a selection of the second source device;
- a transmitter configured to transmit to the second source device an instruction to activate, wherein a first sink device in the first zone changes from presentation of the first data to presentation of the second date in response to an activation of the second source device;
- the transmitter further configured to transmit to the first source device an instruction to decrement a first reference count upon determining no first zone sink device is currently presenting the first data and to transmit to the second source device an instruction to increment a second reference count upon determining no first zone sink device other than the first sink device is currently presenting the second data, wherein the first reference count is a current number of the plurality of zones receiving the first data from the first source device and the second reference count is a current number of the plurality of zones receiving the second data from the second source device; and
- a processor configured to facilitate the change from presentation of the first data to presentation of the second data.

35. The system of claim 34, wherein the wireless home entertainment hub is included in a display device.

36. The system of claim 34, wherein the wireless home entertainment hub is included in a remote control device.

37. The wireless home entertainment hub of claim 34, wherein the indications of registrations with each of the plurality of devices are stored in a memory of the respective devices.

38. The wireless home entertainment hub of claim 34, wherein the indications of registrations prevent the plurality of devices from registering with a different wireless home entertainment hub while simultaneously being registered with the wireless home entertainment hub.

39. A method of changing, by a wireless home entertainment hub in a home entertainment system, from presentation of first data transmitted by a first wireless source device to presentation of second data transmitted by a second wireless source device, wherein the first wireless source device is presently transmitting the first data and the first data is being presented by at least one of a plurality of wireless sink devices, the home entertainment system including the wireless home entertainment hub and a plurality of wireless devices, the plurality of wireless devices including the first and second wireless source devices and the at least one of a plurality of wireless sink devices, the method comprising:
- registering each of the plurality of wireless devices with the wireless home entertainment hub, the registration establishing wireless communication between each of the plurality of wireless devices and the wireless home entertainment hub;
- partitioning the plurality of wireless sink devices into a plurality of zones by assigning each of the plurality of wireless sink devices to one of the plurality of zones when the respective one of the plurality of wireless sink devices is registered with the wireless home entertainment hub;
- detecting, by the wireless home entertainment hub, an activation of the second wireless source device for the presentation of the second data;
- transmitting, by the wireless home entertainment hub, a first instruction to a first wireless sink device in a first zone to stop receiving the first data from the first wireless source device, the first zone comprising a plurality of first zone wireless sink devices;
- transmitting, by the wireless home entertainment hub, a second instruction to the first wireless sink device to receive the second data directly from the second wireless source device;
- transmitting an indication to the second wireless source device that the first wireless sink device is ready to receive the second data; and
- transmitting, by the wireless home entertainment hub, to the first wireless source device an instruction to decrement a first reference count upon determining no first zone wireless sink device is currently presenting the first data and transmitting to the second wireless source device an instruction to increment a second reference count upon determining no first zone wireless sink device other than the first wireless sink device is currently presenting the second data, wherein the first reference count is an indication of a number of the zones receiving the first data from the first wireless source device and the second reference count is an indication of a number of zones receiving the second data from the second wireless source device, wherein each zone of the plurality of zones contains at least one of the plurality of wireless sink devices.

40. The method of claim 39, wherein an indication of the registration with each of the plurality of wireless devices is stored in the wireless home entertainment hub and each respective wireless devices, the registration preventing each of the plurality of wireless devices from registering with a different wireless home entertainment hub while being simultaneously registered with the wireless home entertainment hub.

41. The method of claim 39, wherein ultra wide band frequencies are utilized for the wireless communication between the wireless home entertainment hub and the plurality of wireless devices.

42. The method of claim 39, wherein the second wireless source device begins transmitting the second data in response to receiving the indication from the wireless home entertainment hub, and the at least one of the plurality of wireless sink devices receives the second data directly from the second wireless source devices in response to the instruction from the wireless home entertainment hub.

43. The method of claim 39, wherein the registration permits exchange of the first data and the second data between the plurality of wireless devices and the wireless home entertainment hub, and facilitates direct transfer of the first data and the second data between the plurality of wireless devices in response to receiving instructions from the wireless home entertainment hub.

44. The method of claim 39, wherein the first wireless source device enters a low power mode when the first reference count is zero, indicating none of the plurality of wireless sink device devices are presently receiving the first data from the first source device.

45. The method of claim 39, wherein the activation of the second wireless source device is detected in response to receiving a power on indication from an active source device based on a direct action of the second source device by a user.

* * * * *